(12) United States Patent
Gellani

(10) Patent No.: US 9,380,774 B2
(45) Date of Patent: Jul. 5, 2016

(54) INVERTED SPRAY CAN WITH LID FOR CATCHING, CONTAINING, KILLING OR DISPOSING OF INSECTS

(71) Applicant: Natheer Ahmed Gellani, Dearborn, MI (US)

(72) Inventor: Natheer Ahmed Gellani, Dearborn, MI (US)

( * ) Notice: Subject to any disclaimer, the term of this patent is extended or adjusted under 35 U.S.C. 154(b) by 0 days.

(21) Appl. No.: 13/710,238

(22) Filed: Dec. 10, 2012

(65) Prior Publication Data

US 2014/0157653 A1    Jun. 12, 2014

(51) Int. Cl.
*A01M 13/00* (2006.01)
*A01M 7/00* (2006.01)
*A01M 1/20* (2006.01)
*A01M 3/00* (2006.01)

(52) U.S. Cl.
CPC ........... *A01M 13/003* (2013.01); *A01M 1/2038* (2013.01); *A01M 7/0064* (2013.01); *A01M 3/00* (2013.01); *A01M 7/00* (2013.01); *A01M 7/005* (2013.01)

(58) Field of Classification Search
CPC ..... A01M 13/00; A01M 13/003; A01M 7/00; A01M 7/005; A01M 7/0064; A01M 1/20; A01M 3/00
USPC ......... 43/124, 125, 129, 900; 239/288, 288.3, 239/288.5, 524; 222/182, 402.1, 402.11, 222/402.15, 538
See application file for complete search history.

(56) References Cited

U.S. PATENT DOCUMENTS

| | | | | |
|---|---|---|---|---|
| 2,928,610 | A * | 3/1960 | Fenimore | 239/288.5 |
| 3,314,426 | A * | 4/1967 | Carroll | 128/200.14 |
| 3,713,245 | A * | 1/1973 | Hovey | 43/110 |
| 4,401,240 | A * | 8/1983 | Brack | 222/323 |
| 4,413,756 | A * | 11/1983 | Kirley | 222/402.11 |
| 5,419,077 | A * | 5/1995 | Tombarelli | 43/132.1 |
| 6,637,149 | B1 * | 10/2003 | Bauer | 43/107 |
| 7,431,222 | B2 * | 10/2008 | Monterrosa | 239/288.5 |
| 8,123,761 | B2 * | 2/2012 | Herweijer et al. | 606/131 |
| 2010/0075001 | A1 * | 3/2010 | Succar | B65D 47/2018 426/115 |

FOREIGN PATENT DOCUMENTS

JP     200822838 A  *  2/2008

* cited by examiner

*Primary Examiner* — Darren W Ark
*Assistant Examiner* — Magdalena Topolski
(74) *Attorney, Agent, or Firm* — Reising Ethington P.C.

(57) ABSTRACT

A insect control device includes an inverted poison spray can with a multi-functional lid for catching, containing, killing or disposing of insects. The insect control device can contain the insect, so the user does not have to grab it and perhaps drop and lose it. The insect control device includes an aperture for closing the insect within the lid and allows the user to spray insecticide onto an insect contained within the inverted lid. The lid design contains the insecticide and concentrates it use onto the insect, where desired, rather than getting the insecticide onto the users walls, floors, ceilings or the like. If the user desires, they can carry the insect control device, with the aperture closed and the insect contained in the lid, to a location to release the insect. Typically, the lid will be clear or transparent to allow the user to see inside the lid.

15 Claims, 3 Drawing Sheets

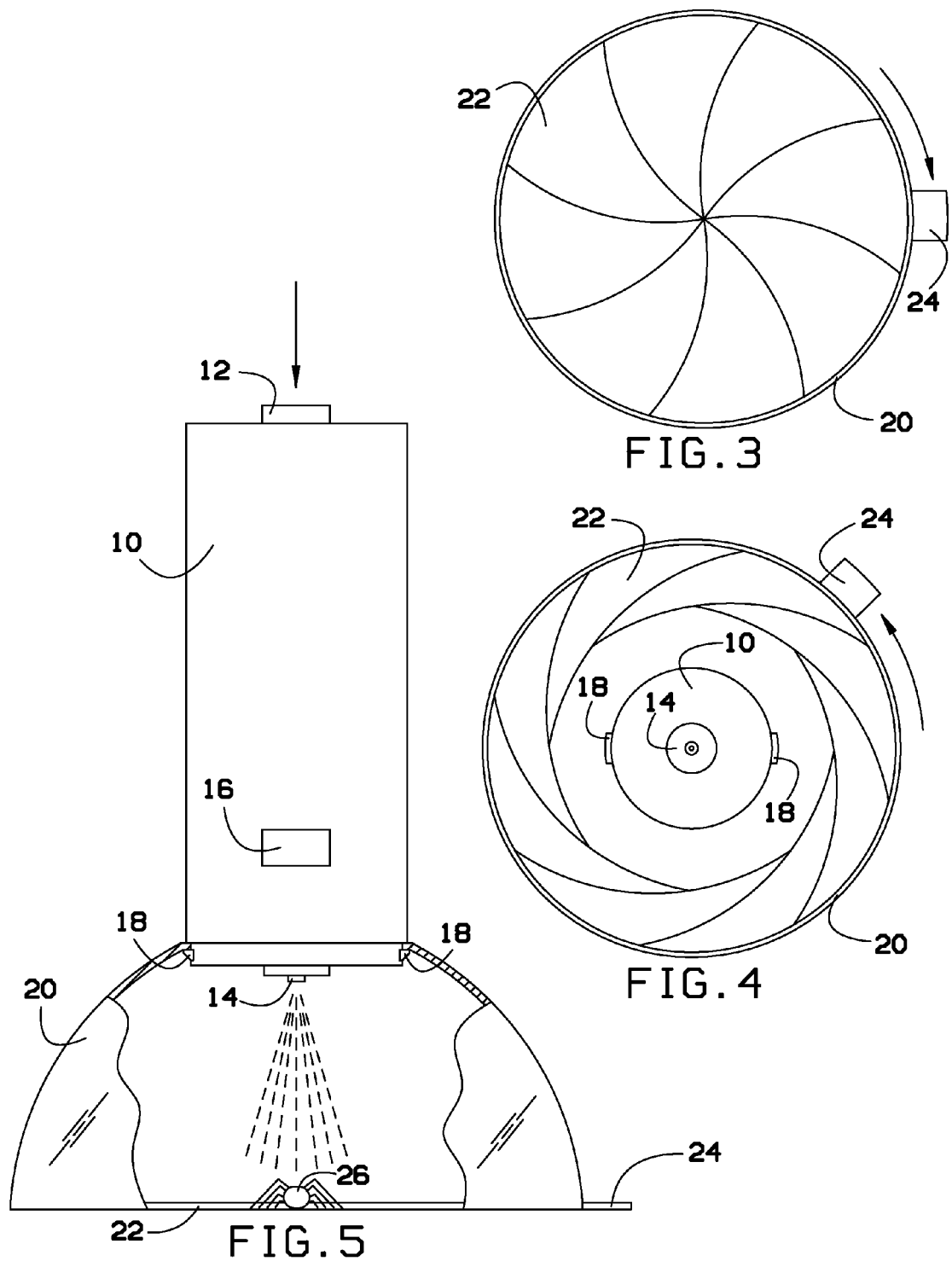

INVERTED SPRAY CAN WITH LID FOR CATCHING, CONTAINING, KILLING OR DISPOSING OF INSECTS

BACKGROUND OF THE INVENTION

The present invention relates to pest and insect control devices and, more particularly, to an inverted spray can having a multi-functional lid for catching, killing, containing or disposing of insects.

Unwanted insects in the home, office, or anywhere, are a nuisance and can even be a phobia to some people. Catching, containing, killing or disposing of these insects could prove difficult, if not dangerous.

Bug sprays are available on the market in various formulations for killing various insects. Many, if not all, bug sprays contain insecticides that can be harmful to people and pets. When using these spray insecticides, a user often has to spray the insect, which may start to run, causing the user to spray a trail of insecticide after the insect. This spray can be difficult to clean up and can leave a trail of insecticide along walls, ceilings and floors. Moreover, the spray can also settle on the user, creating a skin exposure. Finally, the spray can be airborne, causing further scattering of the insecticide and possible inhalation. In addition, many insecticides have an unpleasant odor, which can add to user discomfort when used inside the home or office.

Another method for insect issues is simply squishing the insect. This approach, however, can be messy and requires the user to pick up and remove the dead insect.

For a more humane approach, some people favor a catch and release approach. A user could coax the insect onto a sheet material and carry both outdoors. This approach, however, could permit the insect to run onto the user. Another approach involves putting a container over the insect, covering the bottom, carrying the container outdoors, and releasing the insect. This approach, however, requires the user to have a container or jar, preferably a clear container, readily available to cover the insect. If the user takes a long time to find such a container, the insect could have moved on, not to be found by the user.

As can be seen, there is a need for an improved device for catching, containing, killing or disposing of insects.

SUMMARY OF THE INVENTION

In one aspect of the present invention, a insect control device comprises an insecticide can having a spray nozzle disposed on one end thereof and an insecticide release button for releasing product from the insecticide can; a chamber attached to the insecticide can, wherein the spray nozzle is operable to release product into the chamber; and a closable opening disposed to enclose the chamber, the closable opening disposed opposite the spray nozzle.

In another aspect of the present invention, a insect control device comprises an insecticide can having a spray nozzle disposed on one end thereof and an insecticide release button for releasing product from the insecticide can disposed at an opposite side thereof; a transparent chamber attached to the insecticide can, wherein the spray nozzle is operable to release product into the chamber; a closable opening disposed to enclose the chamber, the closable opening disposed opposite the spray nozzle; and a release button operable to retract one or more latches, the one or more latches operable to secure the insecticide can to the chamber.

In a further aspect of the present invention, a method for catching, containing, killing or disposing of insects comprises placing a chamber over the insect, the chamber having an insecticide can attached thereto, the insecticide can having a spray nozzle disposed on one end thereof and an insecticide release button for releasing product from the insecticide can; and closing a closable opening, disposed opposite the spray nozzle, to contain the insect in the chamber.

These and other features, aspects and advantages of the present invention will become better understood with reference to the following drawings, description and claims.

BRIEF DESCRIPTION OF THE DRAWINGS

FIG. 3 is a bottom view, with its aperture closed, of the insect control device of FIG. 1;

FIG. 4 is a bottom view, with its aperture open, of the insect control device of FIG. 1;

FIG. 5 is a side view of the insect control device of FIG. 1, illustrating one exemplary use thereof.

DETAILED DESCRIPTION OF THE INVENTION

Figure 1:
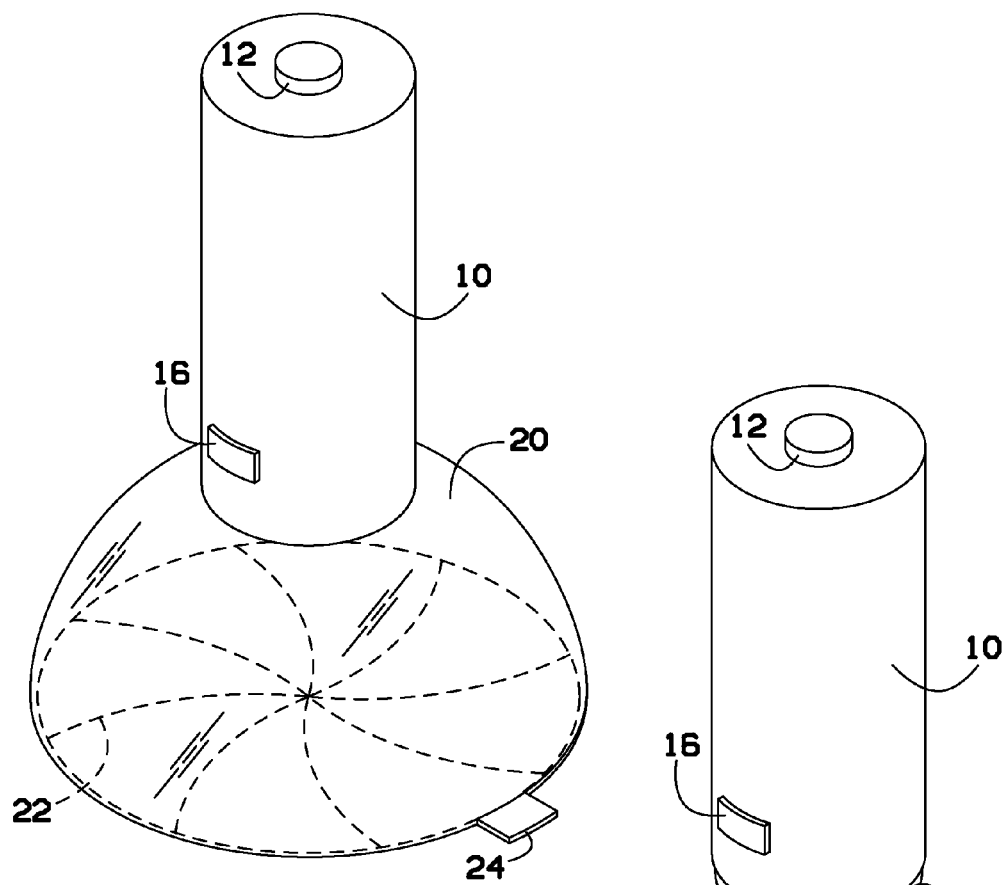
FIG. 1 is a perspective view of an insect control device according to an exemplary embodiment of the present invention.
Figure 2:
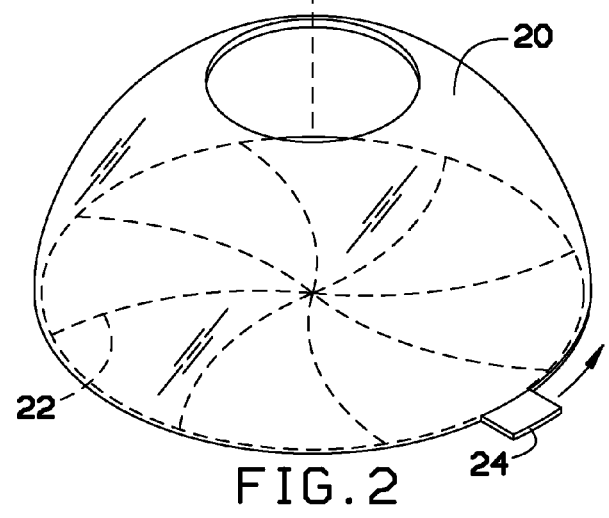
FIG. 2 is an exploded perspective view of the insect control device of FIG. 1.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an insect control device including an inverted poison spray can with a multi-functional lid for catching, containing, killing or disposing of insects. The insect control device can contain the insect, so the user does not have to grab it and perhaps drop and lose it. The insect control device includes an aperture for closing the insect within the lid and provides the option for the user to spray insecticide onto an insect contained within the inverted lid. The lid design contains the insecticide and concentrates it use onto the insect, where desired, rather than getting the insecticide onto the users walls, floors, ceilings or the like. If the user desires, they can simply carry the insect control device, with the aperture closed and the insect contained in the lid, to a desired location to release the insect unharmed. Typically, the lid will be clear or transparent to allow the user to see the insect contained in the lid.

The insect control device having the inverted poison spray can with the clear, multi-functional lid, can not only poison the insect, but kills and captures the insect all at once, allowing for the least possible chance of contact with the insecticide and the insect and preventing insecticide residue from being sprayed hap-hazardously in the air, getting onto surfaces that pets or people may later come in contact.

Referring now to FIGS. 1 through 5, an insecticide can 10 can be attached to a chamber 20 with its spray nozzle disposed inside the chamber 20. The insecticide can 10 can attach to the chamber 20 in various manners. In some embodiments, as shown particularly in FIGS. 2 and 5, the insecticide can 10 can include an insecticide can release button 16 for releasing the insecticide can 10 from the chamber 20. The release button 16 can operate to actuate one or more latches 18 that extend from the insecticide can 10 where the insecticide can 10 attaches to the chamber 20. Depressing the release button 16 can cause the latches 18 to be retracted into the insecticide can 10, allowing removal of the insecticide can 10 from the chamber 20. In some embodiments, the insecticide can 10 can attach to the chamber 20 with a threaded engagement. In this embodiment, the end of the insecticide can 10 having the spray nozzle 14 can be threaded to mate with female threads formed in on open in the chamber 20. In still other embodiments, the insecticide can 10 can attach to the chamber 20 through a snap fit, a twist and lock member, or some other mechanism.

The insecticide can 10 can include an insecticide dispensing button 12 disposed thereupon. Typically, the button 12 can be disposed on top of the insecticide can 10, as shown in the figures, but the button 12 could be disposed in alternate locations, such as on the side of the insecticide can 10. Depressing the button 12 can cause insecticide (or some other form of insect killing or control spray) to be released out of the spray nozzle 14.

While the Figures show the spray nozzle 14 integrated with the insecticide can 10, in some embodiments of the present invention, the spray nozzle 14 can be integrated with the chamber 20. In this embodiment, the insecticide can 10 can attach to the chamber 20 in such a way so that the insecticide in the can 10 can be delivered through the chamber-integrated spray nozzle. This embodiment may also allow replacement of the insecticide can 10 without the added cost of a new spray nozzle with each replacement can.

With the insecticide can 10 is in place on the chamber 20 (as shown in FIG. 1), the user can depress the button 12, releasing insecticide onto an insect 26 (as shown in FIG. 5). Typically, the user would close the aperture 22, as described below, before depressing the button 12, but the user would have the option of leaving the aperture 22 open—in either event, the insecticide is limited in its dispersion. Once the insect 26 is killed, the user can carry the container to a waste disposal, open the aperture 22 and discard the killed insect. Optionally, the user can simply close the aperture 22 and carry the insect to a desired release location and release the insect unharmed.

Figure 6:
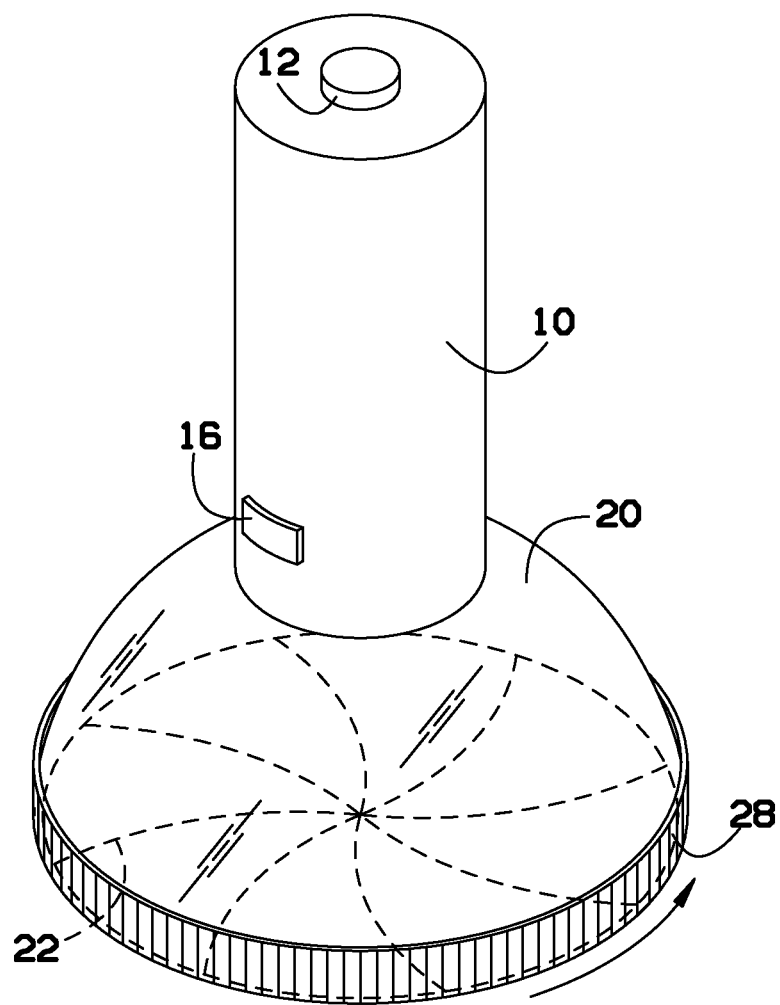
FIG. 6 is a perspective view of an insect control device according to an alternate embodiment of the present invention.

The aperture 22 can open and close along a bottom of the chamber 20 (opposite the spray nozzle 14 of the insecticide can 10). The aperture 22 can open and close via various mechanisms. In some embodiments, a aperture actuating tab 24 can be rotated about an exterior of the chamber 20 to cause the aperture 22 to open and close (as shown in FIGS. 3 and 4). In other embodiments, the aperture 22 can be opened and closed through an aperture actuating twist band 28, disposed about the outer periphery of the chamber 20, as shown in FIG. 6.

While the opening and closing portion of the chamber 20 is described and shown as a shutter type aperture 22, other chamber closures, pertaining to the invention as a whole and as may be appreciated by one skilled in the art, can be used to open and close the bottom of the chamber 20.

The insect control device of the present invention can be manufactured as a two-part device, where a user can purchase refill insecticide cans 10 as needed, and keep their chamber 20. In some embodiments, the insect control device can be manufactured as a one piece device. In this case, the release button 16 and the latches 18 may not be necessary, however, they still could be included to permit, for example, a user to clean the chamber 20 if desired.

The insect control device of the present invention can be made in various sizes and shapes. The chamber 20 can have an opening that can vary from about 2 inches to about 12 inches, for example. Home, office and travel sizes may be manufactured for user convenience.

While the drawings show a rounded, dome-shaped chamber 20, the chamber 20 can take on various shapes and configurations. The opening to the chamber 20 could be round (as shown) square, rectangular, polygonal, or other geometric or non-geometric shape. Similarly, and independent of the shape of the opening to the chamber 20, the chamber itself can be dome-shaped and rounded, as shown, or may include edges, corners or other configurations.

The insect control device of the present invention can be made from various materials. The insecticide can 10 can be made similar to a conventional insecticide can, however, the actuator to release the insecticide (button 12) can be disposed on the top or side of the insecticide can 10. The chamber 20 can be made of a plastic material, typically a clear or transparent plastic material, although other materials can be used for some or all of the chamber 20, as may be desired by the user.

The insect control device can release insecticide, via the depression of the release button 12, in various orientations, thereby permitting the use of the insect control device on walls, floors and ceilings. Regardless of direction of use, the user can release insecticide without fear of the poison falling back onto them or contaminating the area surrounding the insect.

It should be understood, of course, that the foregoing relates to exemplary embodiments of the invention and that modifications may be made without departing from the spirit and scope of the invention as set forth in the following claims.

What is claimed is:

1. An insect control device comprising:
an insecticide can having an outlet nozzle disposed on one end thereof and an insecticide release button disposed on an end of the insecticide can opposite the outlet nozzle for releasing product from the insecticide can, the insecticide can storing an insecticide;
a chamber having a first end attached to the insecticide can, wherein the outlet nozzle is disposed inside the chamber and is operable to release product into the chamber; and
a closeable aperture at a second end of the chamber opposite the first end, the closeable aperture comprising a shutter that can be actuated between an open state and a closed state, the shutter extending radially inward from a periphery of the chamber at the second end to enclose the chamber at the second end when actuated from the open state to the closed state, and wherein the periphery of the closeable aperture at the second end has a circumference that surrounds and is greater than a maximum circumference of the insecticide can.

2. The insect control device of claim 1, wherein the outlet nozzle is a spray nozzle attached to the insecticide can.

3. The insect control device of claim 1, wherein the outlet nozzle attaches to a spray nozzle integrated with the chamber.

4. The insect control device of claim 1, wherein the insecticide can is removable from the chamber.

5. The insect control device of claim 1, further comprising a release button operable to retract one or more latches, the one or more latches operable to secure the insecticide can to the chamber.

6. The insect control device of claim 1, further comprising an aperture actuating tab extending from the chamber and operable to open and close the closeable aperture.

7. The insect control device of claim 1, further comprising an aperture actuating twist band disposed about at least a portion of the outer periphery of the chamber and operable to open and close the closeable aperture.

8. The insect control device of claim 1, wherein the chamber is formed from a transparent material.

9. An insect control device comprising:
an insecticide can having a spray nozzle disposed on one end thereof and an insecticide release button disposed on an end of the insecticide can opposite the outlet nozzle for releasing product from the insecticide can, the insecticide can storing the releasable product and having a longitudinal axis;
a transparent chamber having a first end attached to the insecticide can, wherein the spay nozzle is operable to release product into the chamber, and wherein the insecticide can is attached to the chamber such that the longitudinal axis of the insecticide can is coaxially aligned with a longitudinal axis of the chamber;
a closeable aperture at a second end of the chamber opposite the first end, the closeable aperture comprising a shutter that can be actuated between an open state and a closed state, the shutter extending radially inward from a periphery of the chamber at the second end to enclose the chamber at the second end when actuated from the open state to the closed state, and wherein the periphery of the closeable aperture at the second end has a circumference that surrounds and is greater than a maximum circumference of the insecticide can; and
a release button operable to retract one or more latches that secure the insecticide can to the transparent chamber.

10. The insect control device of claim 9, further comprising an actuating tab extending from the chamber and operable to open and close the closeable aperture.

11. The insect control device of claim 9, further comprising an actuating twist band disposed about at least a portion of the periphery of the chamber and operable to open and close the closeable aperture.

12. A method of catching, containing, killing or disposing of insects, the method comprising:
providing an insecticide control device that includes an insecticide can and a chamber attached to the insecticide can such that an outlet nozzle of the insecticide can is disposed inside the chamber, the chamber including a first end that is attached to the insecticide can and a second end opposite the first end that defines a closeable aperture, wherein a periphery of the closeable aperture at the second end has a circumference that surrounds and is greater than a maximum circumference of the insecticide can at the first end, and wherein the insecticide can is attached to the chamber such that a longitudinal axis of the insecticide can is coaxially aligned with a longitudinal axis of the chamber;
placing the chamber over an insect when the closeable aperture is in an open state to trap the insect within the chamber; and
actuating a shutter at the closeable aperture from the open state to a closed state to enclose the chamber at the second end to thereby contain the insect in the chamber, wherein the shutter extends radially inward from the periphery of the chamber at the second end when actuated from the open state to the closed state; and
depressing an insecticide release button disposed on an end of the insecticide can opposite the outlet nozzle to release product stored in the insecticide can from the outlet nozzle into the chamber.

13. The method of claim 12, further comprising removing the chamber from the insecticide can by depressing a can release button and releasing one or more latches.

14. The method of claim 12, wherein the chamber is a transparent chamber.

15. The method of claim 12, further comprising moving the chamber to a desired release location, actuating the closeable aperture from the closed state to the open state, and releasing the insect from the chamber.

* * * * *